(12) United States Patent
Takeda et al.

(10) Patent No.: US 10,609,756 B2
(45) Date of Patent: Mar. 31, 2020

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Liu Liu, Beijing (CN); Huiling Jiang, Beijing (CN); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 152 days.

(21) Appl. No.: 15/546,326

(22) PCT Filed: Jan. 29, 2016

(86) PCT No.: PCT/JP2016/052608
§ 371 (c)(1),
(2) Date: Jul. 26, 2017

(87) PCT Pub. No.: WO2016/121909
PCT Pub. Date: Aug. 4, 2016

(65) Prior Publication Data
US 2018/0270846 A1  Sep. 20, 2018

(30) Foreign Application Priority Data

Jan. 29, 2015 (JP) ................................. 2015-016058

(51) Int. Cl.
*H04L 5/00* (2006.01)
*H04W 76/27* (2018.01)
(Continued)

(52) U.S. Cl.
CPC ............. *H04W 76/27* (2018.02); *H04W 4/06* (2013.01); *H04W 28/0268* (2013.01);
(Continued)

(58) Field of Classification Search
CPC . H04W 72/1242; H04W 4/06; H04W 68/005; H04W 76/27; H04W 72/10;
(Continued)

(56) References Cited

U.S. PATENT DOCUMENTS 9,241,287 B2 * 1/2016 Montojo ........... H04W 36/0061
9,769,236 B2 * 9/2017 Einarsson .......... H04N 21/6125
(Continued)

OTHER PUBLICATIONS

International Search Report issued in PCT/JP2016/052608 dated Apr. 5, 2016 (1 page).
(Continued)

*Primary Examiner* — Lan-Huong Truong
(74) *Attorney, Agent, or Firm* — Osha Liang LLP

(57) ABSTRACT

The present invention is designed so that a plurality of channels can be received adequately even when the bandwidth to use is limited to a narrowband which is a part of a system bandwidth. A user terminal, in which the bandwidth to use is limited to the narrowband which is a part of the system bandwidth, has a receiving section that receives a broadcast transport block and a unicast transport block, and a control section that switches the transport block to receive depending on the RRC mode of the user terminal, and, when the receiving section receives both the broadcast transport block and the unicast transport block and the user terminal is in the RRC-connected mode, the control section exerts control so that the unicast transport block is received, based on priorities that are determined in advance.

5 Claims, 11 Drawing Sheets

(51) Int. Cl.
*H04W 72/02* (2009.01)
*H04W 4/06* (2009.01)
*H04W 28/02* (2009.01)
*H04W 68/00* (2009.01)
*H04W 72/10* (2009.01)
*H04W 72/12* (2009.01)
*H04W 74/00* (2009.01)

(52) U.S. Cl.
CPC ......... *H04W 68/005* (2013.01); *H04W 72/02* (2013.01); *H04W 72/10* (2013.01); *H04W 72/1242* (2013.01); *H04W 74/008* (2013.01)

(58) Field of Classification Search
CPC ........... H04W 74/008; H04W 28/0268; H04W 72/02; H04W 4/04
See application file for complete search history.

(56) References Cited

U.S. PATENT DOCUMENTS 9,826,417 B2 * 11/2017 Liu .................. H04L 12/189
2013/0039302 A1 * 2/2013 Miki ................ H04L 5/001
370/329

OTHER PUBLICATIONS

Written Opinion of the International Searching Authority issued in PCT/JP2016/052608 dated Apr. 5, 2016 (4 pages).

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

Office Action issued in corresponding Japanese Application No. 2016-572168, dated Oct. 17, 2017 (8 pages).

Sony; "MTC Operation using ePDCCH"; 3GPP TSG-RAN WG1 Meeting #79, R1-145019; San Francisco, USA; Nov. 17-21, 2014 (17 pages).

* cited by examiner

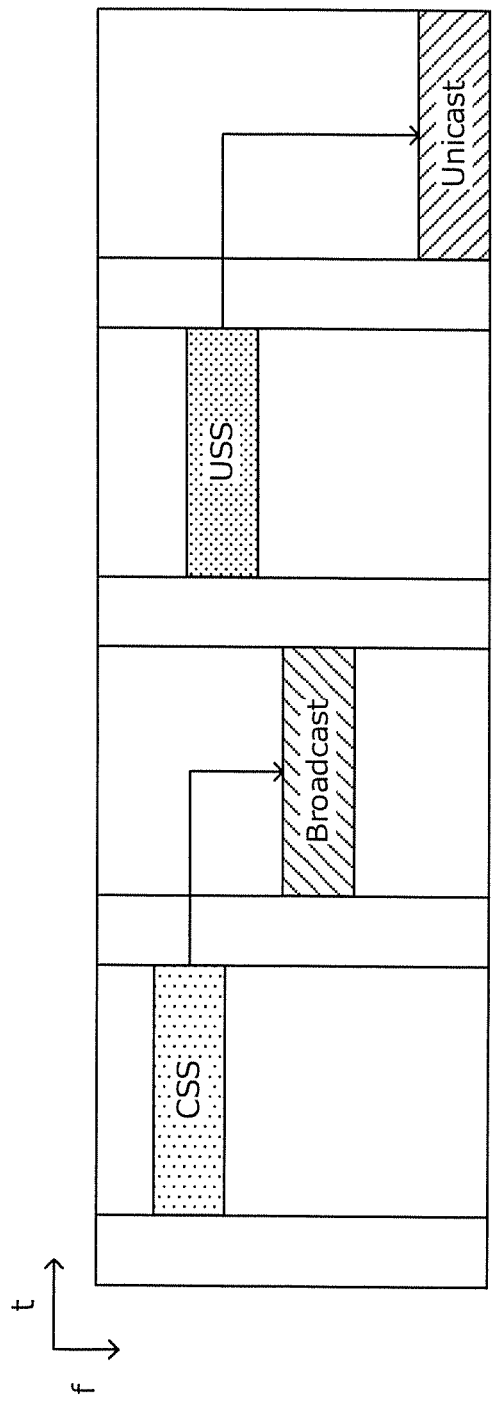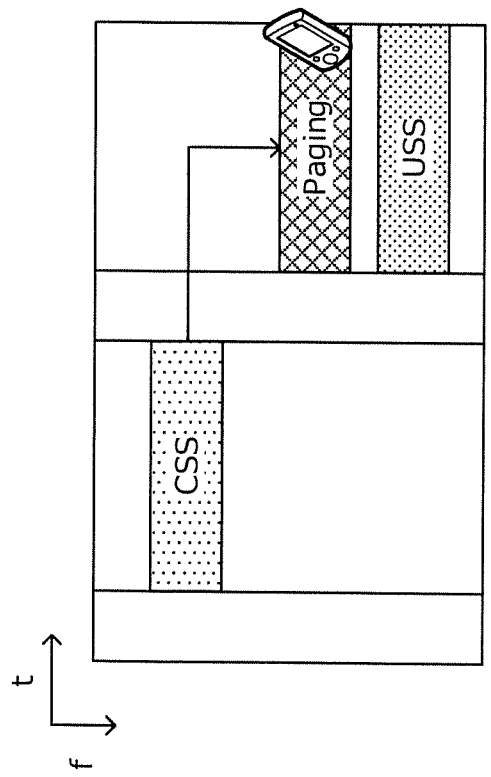
FIG. 5A
FIG. 5B

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). While the specifications of LTE-advanced have been already drafted for the purpose of achieving further broadbandization and higher speeds beyond LTE, in addition, for example, a successor system of LTE—referred to as "FRA" (Future Radio Access)—is under study.

Now, accompanying the cost reduction of communication devices in recent years, active development is in progress in the field of technology related to machine-to-machine communication (M2M) to implement automatic control of network-connected devices and allow these devices to communicate with each other without involving people. In particular, of all M2M, 3GPP (3rd Generation Partnership Project) is promoting standardization with respect to the optimization of MTC (Machine-Type Communication), as a cellular system for machine-to-machine communication (see non-patent literature 2). MTC terminals are being studied for use in a wide range of fields, such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on Provision of Low-Cost Machine-Type Communications (MTC) User Equipments (UEs) based on LTE (Release 12)"

SUMMARY OF INVENTION

Technical Problem

From the perspective of reducing the cost and improving the coverage area in cellular systems, amongst all MTC terminals, low-cost MTC terminals, which can be implemented in simple hardware structures, have been increasing in demand. Low-cost MTC terminals can be implemented by limiting the uplink bandwidth and the downlink bandwidth to use to part of a system bandwidth. A system bandwidth is equivalent to, for example, an existing LTE band (for example, 20 MHz), a component carrier and so on.

When the bandwidth to use is limited to part of a system bandwidth, the signals and channels used in existing systems cannot be received. For example, when a plurality of channels (broadcast, unicast, etc.) are transmitted at the same time, it is difficult to receive all of these channels.

The present invention has been made in view of the above, and it is therefore an object of the present invention to provide a user terminal and a radio communication method, whereby a plurality of channels can be received adequately even when the bandwidth to use is limited to a narrowband which is a part of a system bandwidth.

Solution to Problem

According to the present invention, a user terminal, in which the bandwidth to use is limited to a narrowband which is a part of a system bandwidth, has a receiving section that receives a broadcast transport block and a unicast transport block, and a control section that switches the transport block to receive depending on the RRC mode of the user terminal, and, when the receiving section receives both the broadcast transport block and the unicast transport block and the user terminal is in the RRC-connected mode, the control section exerts control so that the unicast transport block is received, based on priorities that are determined in advance.

Advantageous Effects of Invention

According to the present invention, it is possible to receive a plurality of channels adequately even when the bandwidth to use is limited to a narrowband which is a part of a system bandwidth.

BRIEF DESCRIPTION OF DRAWINGS

FIG. 5 provide diagrams to explain conventional methods;

DESCRIPTION OF EMBODIMENTS

Now, an embodiment of the present invention will be described in detail below with reference to the accompanying drawings. In order to reduce the cost of MTC terminals, there are ongoing studies to lower the processing capabilities of terminals by lowering the peak rate, limiting the resource blocks, and allowing limited RF (Radio Frequency) reception. For example, the following limitations are under study in order to reduce the cost of MTC terminals. The maximum transport block size in unicast transmission using a physical downlink shared channel (PDSCH) may be limited to 1000 bits. The maximum transport block size in BCCH (Broadcast Control CHannel) transmission using the PDSCH may be limited to 2216 bits. The downlink data channel bandwidth may be limited to 6 resource blocks (PRBs (Physical Resource Blocks)). The RFs to receive in MTC terminals may be limited to one.

The transport block size and the resource blocks in low-cost MTC terminals are more limited than in existing user terminals, and therefore low-cost MTC terminals cannot connect with cells in compliance with LTE Rel. 8 to 11. Low-cost MTC terminals connect only with cells where a permission of access is reported to the low-cost MTC terminals in broadcast signals.

Figure 1A:
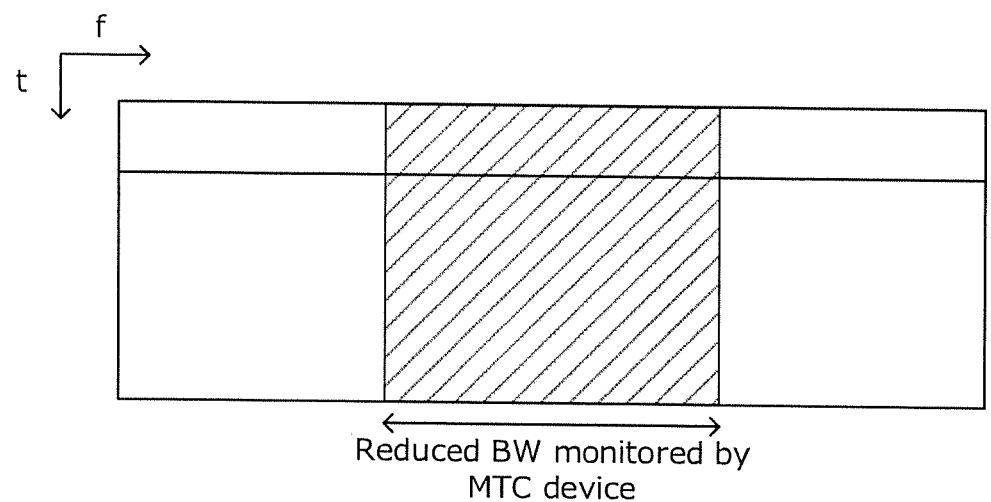
FIG. 1 provide diagrams to explain an MTC terminal and bandwidths for its use.

For MTC terminals, a study is in progress to limit not only downlink data signals, but also various control signals that are transmitted on the downlink, such as system information and downlink control signals, as well as data signals and various control signals that are transmitted on the uplink, to predetermined narrowband (for example, 1.4 MHz). That is, MTC terminals can monitor only the narrowband (reduced bandwidths) that constitute the bandwidths for their use (see FIG. 1A).

MTC terminals need to be operated in the LTE system bandwidth, considering the relationship with existing user terminals. Here, MTC terminals refer to terminals, in which the bandwidth to use is limited to a narrowband (for example, 1.4 MHz) which is a part of a system bandwidth. Existing user terminals refer to terminals, in which the system bandwidth (for example, 20 MHz) is the bandwidth to use. In a system bandwidth, frequency-multiplexing of MTC terminals and existing user terminals is supported. MTC terminals support only RFs of predetermined narrowband in the uplink and the downlink.

The bandwidth for use by MTC terminals is limited to the narrowband, and the bandwidth for use by existing terminals is configured to the system bandwidth. Since MTC terminals are designed based on the narrowband, they have simplified hardware structures, and their processing capabilities are more limited than existing user terminals. MTC terminals may be referred to as "LC-MTC" (low cost MTC or low complexity MTC), "MTC UEs," and so on. Existing user terminals may be referred to as "normal UEs," "non-MTC UEs," "category 1 UEs" and so on.

MTC terminals support only predetermined narrowband (1.4 MHz), and therefore cannot detect the downlink control information (DCI) that is transmitted in the wide-bandwidth PDCCH. So, it may be possible to allocate downlink (PDSCH) and uplink (PUSCH: Physical Uplink Shared CHannel) resources to MTC terminals by using an enhanced PDCCH (EPDCCH: Enhanced PDCCH).

The EPDCCH is formed with enhanced control channel elements (ECCEs), and the user terminals acquire downlink control signals by monitoring (blind-decoding) the search spaces. As for the search spaces, a UE-specific search space (USS), which is configured individually for each user terminal, and a common search space (CSS), which is configured to be shared by each user terminal, can be configured.

Figure 1B:
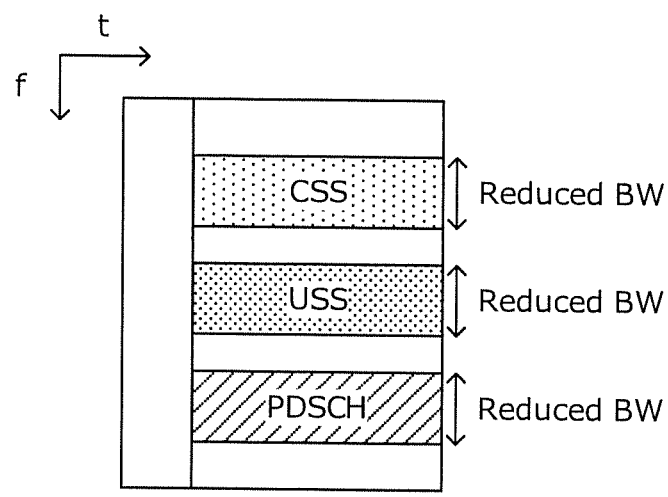

The EPDCCH set and the PDSCH need not be located in one narrowband. For example, as shown in FIG. 1B, a CSS, a USS and a PDSCH may be configured in a plurality of narrowbands separately.

Now, the arrangement of predetermined frequency bandwidths in a downlink system bandwidth will be described with reference to FIG. 2 and FIG. 3.

Figure 2A:
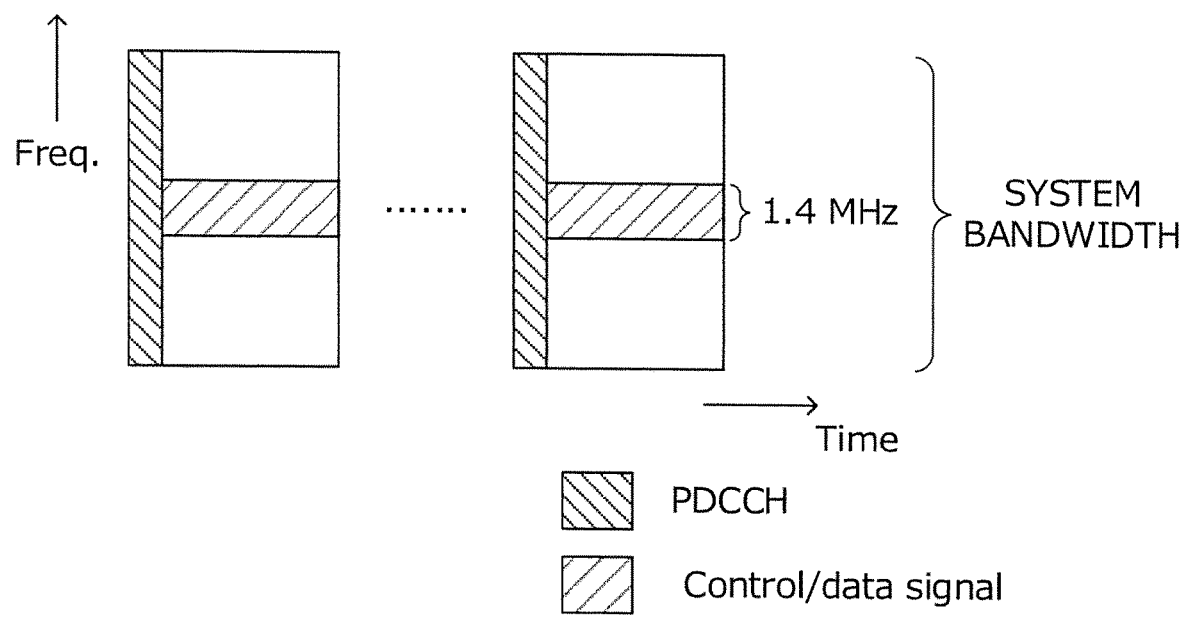
FIG. 2 provide diagrams to explain the arrangement of predetermined frequency bandwidths in a system bandwidth on the downlink.
Figure 2B:
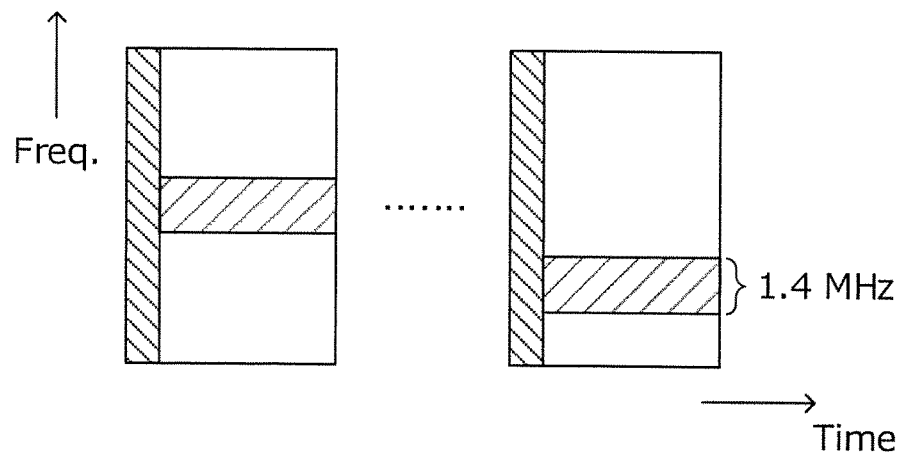

In the example shown in FIG. 2, the bandwidth for use by MTC terminals is limited to a narrowband (for example, 1.4 MHz) which is a part of a system bandwidth. In the example shown in FIG. 2A, the location of the 1.4-MHz frequency bandwidth is fixed over a plurality of subframes. In this case, no frequency diversity effect can be achieved, and therefore there is a threat the spectral efficiency might decrease. Also, the problem arises that the traffic of MTC terminals concentrates in the center frequency. In the example shown in FIG. 2B, the location of the 1.4-MHz frequency bandwidth changes per subframe and is variable. In this case, a frequency diversity effect is achieved, so that it is possible to reduce the decrease of spectral efficiency. Furthermore, the traffic of MTC terminals can be dispersed.

Figure 3:
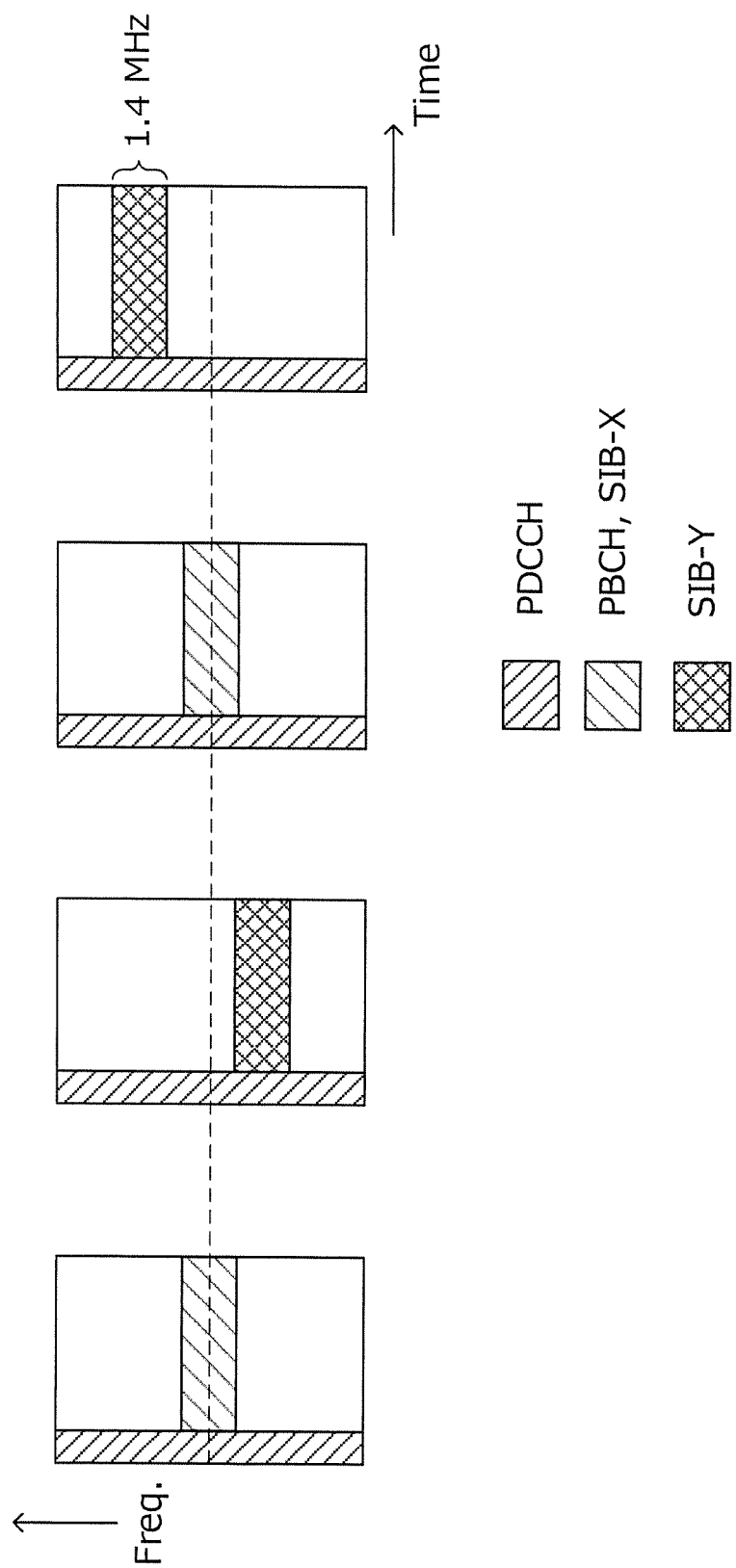
FIG. 3 is a diagram to explain the arrangement of predetermined frequency bandwidths in a system bandwidth on the downlink.

As shown in FIG. 3, when broadcast information is transmitted by changing the location of a predetermined frequency bandwidth per subframe, a physical broadcast channel (PBCH) is transmitted in the central 1.4-MHz of a subframe. As for the system information blocks (SIBs), given that MTC terminals can only receive in 6 resource blocks, which is insufficient for transmitting broadcast information, and cannot read the common search space (CSS) in a physical downlink control channel (PDCCH), new SIBs, including ones that support coverage enhancement mode and ones that do not, are set forth for dedicated use for MTC terminals. The new SIBs for dedicated use for MTC terminals will be hereinafter referred to as "MTC-SIBs" or "M-SIBs."

MTC terminals do not support simultaneous receipt of transport blocks, and are limited to receiving only one transport block at a time. Consequently, when a plurality of pieces of information are transmitted as shown in FIG. 4, how to receive these is the problem.

Figure 4A:
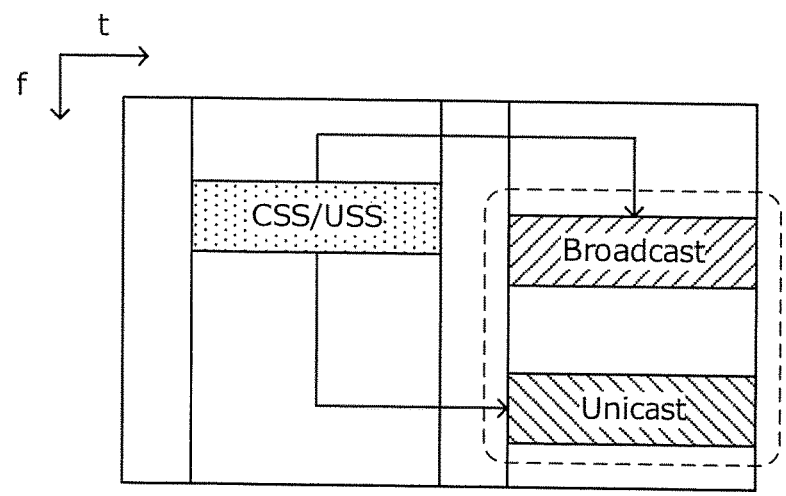
FIG. 4 provide diagrams to explain cases where a plurality of pieces of information are transmitted.
Figure 4B:
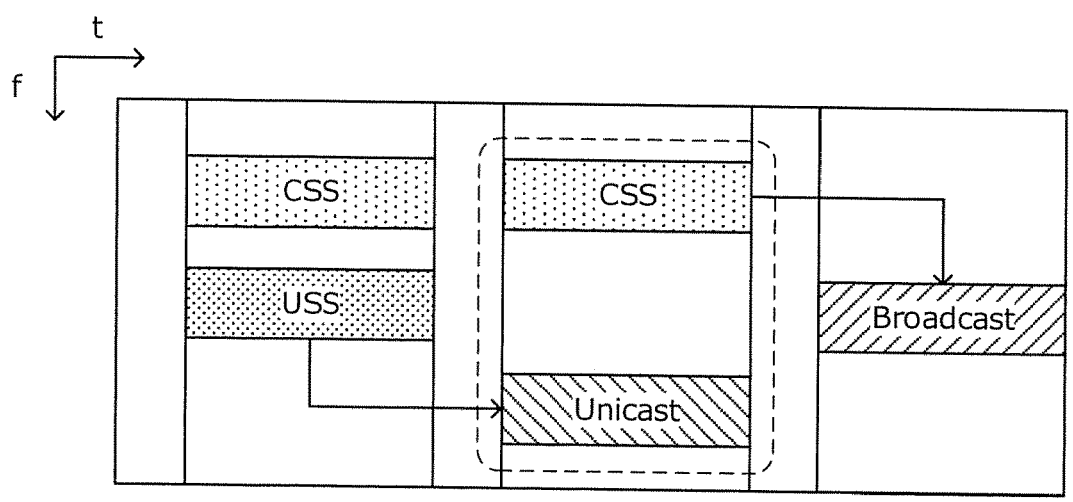
Figure 4C:
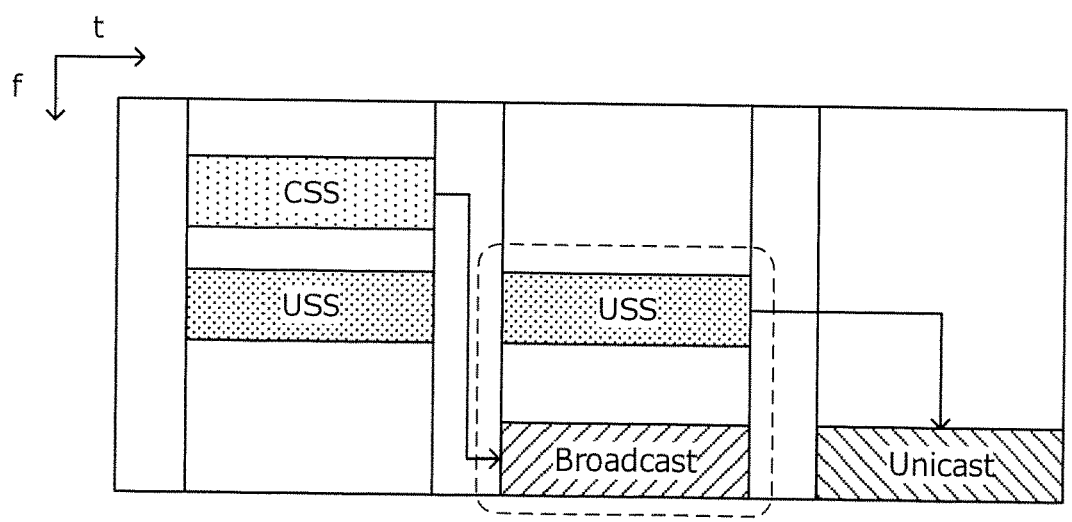

In the example shown in FIG. 4A, a broadcast transport block (PDSCH) and a unicast transport block (PDSCH) are transmitted simultaneously. In the example shown in FIG. 4B, a CSS (EPDCCH) and a unicast transport block (PDSCH) are transmitted simultaneously. In the example shown in FIG. 4C, a USS (EPDCCH) and a broadcast transport block (PDSCH) are transmitted simultaneously. In this way, when a plurality of PDSCHs are received, or when an EPDCCH and a PDSCH are received at the same time, how MTC terminals should operate to receive these is the problem.

Avoiding simultaneous receipt of transport blocks has heretofore depended on scheduling by radio base stations, and the method in which a radio base station schedules only one piece of information (for example, a broadcast transport block or a unicast transport block) for a user terminal has been used (see FIG. 5A). In the example shown in FIG. 5A, a broadcast transport block (PDSCH) and a unicast transport block (PDSCH) are transmitted in different subframes. However, this method is inefficient and only allows limited scheduling.

Also, avoiding simultaneous receipt of transport blocks has heretofore relied on the implementation of user terminals, and the method to allow a user terminal to decide on its own which information should be detected has been used (see FIG. 5B). In the example shown in FIG. 5B, while a radio base station transmits a USS (EPDCCH) to a user terminal, the user terminal is determined to receive a paging signal. Consequently, the resource in which the USS is transmitted is wasted. In this way, according to this method, the radio base station and the user terminal fail to share a common understanding of one another, and, due to this, retransmissions and suchlike events occur, and resources are wasted.

In view of the above, the present inventors have found out a new terminal operation for use for MTC terminals when a plurality of channels are received. According to this terminal operation, MTC terminals receive multiple channels based on priorities. By this means, it is possible to improve the rate of communication, and, furthermore, reduce the waste of resources.

Although, in the following description, MTC terminals will be shown as an example of user terminals in which the bandwidth to use is limited to a narrowband, the application of the present invention is not limited to MTC terminals. Furthermore, although 6-PRB (1.4-MHz) narrowband will be described below, the present invention can be applied to other narrowbands as well, based on the present description.

FIRST EXAMPLE

According to the first example, a method to allow an MTC terminal to receive channels based on priorities when receiving a plurality of PDSCHs or when receiving an EPDCCH and a PDSCH at the same time will be described.

When receiving a plurality of PDSCHs, an MTC terminal receives only one PDSCH, among the PDSCHs of varying types, based on priorities that are determined in advance. When receiving an EPDCCH and a PDSCH at the same time, an MTC terminal receives only one of the PDSCH and the EPDCCH, based on priorities that are determined in advance between the PDSCH and the EPDCCH.

The priorities for when a plurality of PDSCHs are received will be described. In this case, the priority ranks of channels vary depending on what RRC (radio resource control) mode an MTC terminal is in. During the random access procedure, the RRC modes of an MTC terminal are divided into the RRC-idle mode and the RRC-connected mode.

In the following description, for example, a unicast transport block (PDSCH) will refer to a unicast transport block that is mapped to a PDSCH that is scheduled by DCI scrambled by the C-RNTI (Cell-Radio Network Temporary Identifier) or the SPS C-RNTI (Semi-Persistent Scheduling C-RNTI) assigned to a USS-forming EPDCCH in a previous subframe. A USS (EPDCCH) will refer to DCI that is scrambled by the C-RNTI or the SPS C-RNTI assigned to the EPDCCH where the USS is formed. A paging signal (PDSCH) will refer to a PDSCH that carries paging information, and that, for example, is scheduled by DCI scrambled by the P-RNTI (paging-RNTI) assigned to a CSS-forming EPDCCH in a previous subframe.

<During Random Access Procedure>

When the MTC terminal is engaged in the random access procedure, the receipt of a random access response or message 4 (PDSCH) is prioritized over the receipt of an M-SIB or a paging signal (PDSCH).

<RRC-Idle Mode>

When the MTC terminal is in the RRC-idle mode and receives a notification of change without system information, the receipt of a paging signal (PDSCH) is prioritized over the receipt of an M-SIB (PDSCH).

When the MTC terminal is in the RRC-idle mode and receives a notification of change of system information, the receipt of an M-SIB (PDSCH) is prioritized over the receipt of a paging signal (PDSCH).

<RRC-Connected Mode>

When the MTC terminal is in the RRC-connected mode, receiving a unicast transport block (PDSCH) is prioritized over receiving a broadcast transport block (PDSCH).

Even when a broadcast transport block (PDSCH) is received, more priorities might apply depending on the type of notification of change received. When the MTC terminal is in the RRC-connected mode and receives a notification of change without system information, the receipt of a paging signal (PDSCH) is prioritized over the receipt of an M-SIB (PDSCH). When the MTC terminal is in the RRC-connected mode and receives a notification of change of system information, the receipt of an M-SIB (PDSCH) is prioritized over the receipt of a paging signal (PDSCH).

Next, the priorities for when an EPDCCH and a PDSCH are received at the same time will be described.

<During Random Access Procedure>

While the MTC terminal is engaged in the random access procedure, the receipt of a random access response or message 4 (EPDCCH or PDSCH) is prioritized over the receipt of an M-SIB or a paging signal (EPDCCH or PDSCH).

<RRC-Idle Mode>

When the MTC terminal is in the RRC-idle mode and receives a notification of change without system information, the receipt of a paging signal (EPDCCH or PDSCH) is prioritized over the receipt of an M-SIB (EPDCCH or PDSCH).

When the MTC terminal is in the RRC-idle mode and receives a notification of change of system information, the receipt of an M-SIB (EPDCCH or PDSCH) is prioritized over the receipt of a paging signal (EPDCCH or PDSCH).

<RRC-Connected Mode >

When the MTC terminal is in the RRC-connected mode, the receipt of a unicast transport block (PDSCH) is prioritized over the receipt of a CSS or a USS (EPDCCH).

When the MTC terminal is in the RRC-connected mode and receives a notification of change without system information, the receipt of a paging signal (EPDCCH or PDSCH) is prioritized over the receipt of an M-SIB (EPDCCH or PDSCH).

MTC terminal is in the RRC-connected mode and receives a notification of change of system information, the receipt of an M-SIB (EPDCCH or PDSCH) is prioritized over the receipt of a paging signal (EPDCCH or PDSCH).

When the MTC terminal is in the RRC-connected mode, two methods may be applicable—namely, the method in which all subframes are assigned priorities and the method in which only specific subframes are assigned priorities. When all subframes are assigned priorities, the receipt of a paging signal (PDSCH) is prioritized over the receipt of a USS (EPDCCH). When only specific subframes are assigned priorities, these specific subframes are defined in advance or included and reported in an SIB or RRC signaling. When specific subframes are assigned priorities, the receipt of a paging signal (PDSCH) is prioritized over the receipt of a USS (EPDCCH).

When the MTC terminal is in the RRC-connected mode and receives a notification of change without system information, the receipt of a USS (EPDCCH) is prioritized over the receipt of an M-SIB (PDSCH).

When the MTC terminal is in the RRC-connected mode and receives a notification of change of system information, the receipt of an M-SIB (PDSCH) is prioritized over the receipt of a USS (EPDCCH).

SECOND EXAMPLE

According to a second example, the method to allow an MTC terminal to receive channels based on resource locations and priorities when receiving a PDSCH and an EPDCCH at the same time will be described.

Figure 6:
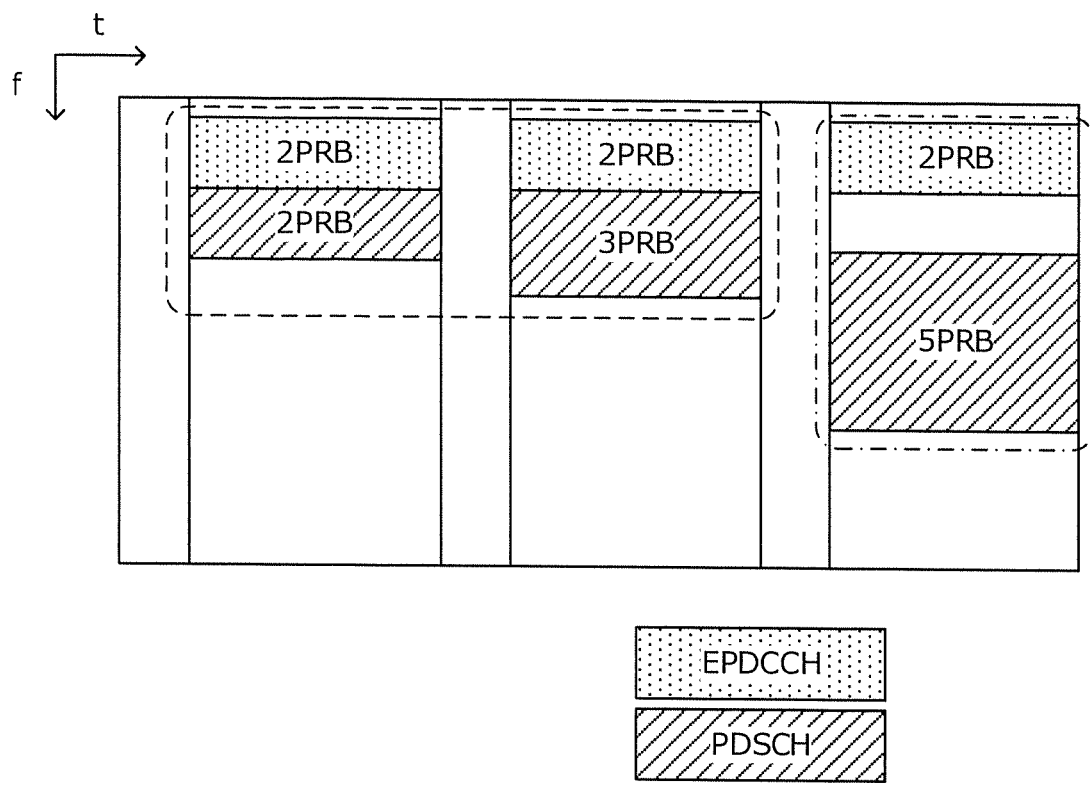
FIG. 6 is a diagram to explain the locations of resources according to a second example.

An MTC terminal receives channels based on the location of a set of a PDSCH and an EPDCCH and based on priorities that are determined in advance. When a set of a PDSCH and an EPDCCH is located within 6 resource blocks, the MTC terminal receives both the PDSCH and the EPDCCH. In the example shown in FIG. 6, the sets of a PDSCH and an EPDCCH located in the area surrounded by a dashed line are both within 6 resource blocks: 2 PRBs+2 PRBs=4 PRBs, 2 PRBs+3 PRBs=5 PRBs. Consequently, the MTC terminal receives both of these PDSCHs and EPDCCHs.

When a set of a PDSCH and an EPDCCH is located in over 6 resource blocks, the MTC terminal receives only one of the PDSCH and the EPDCCH. Which one the PDSCH and the EPDCCH is received follows the priorities explained in the first example. In the example shown in FIG. 6, the set of a PDSCH and an EPDCCH located in the area surrounded by a dashed line with dots exceeds 6 resource blocks: 2 PRBs+5 PRBs=7 PRBs. Consequently, the MTC terminal receives only one of the PDSCH and the EPDCCH according to the priorities that are determined in advance.

As shown with the first example and the second example, when receiving a plurality of PDSCHs, an MTC terminal receives only one PDSCH based on priorities that are determined in advance. When receiving a PDSCH and an EPDCCH at the same time, the MTC terminal receives only one of the PDSCH and the EPDCCH based on priorities that are determined in advance, or receives both or only one of the PDSCH and the EPDCCH, depending on resource locations and priorities. By this means, it is possible to improve the rate of communication, and, furthermore, reduce the waste of resources.

Structure of Radio Communication System)

Now, the structure of the radio communication system according to the present embodiment will be described below. In this radio communication system, the radio communication methods according to the embodiments of the present invention are employed. Here, although MTC terminals will be shown as examples of user terminals in which the bandwidth to use is limited to the narrowband, the present invention is by no means limited to MTC terminals.

Figure 7:
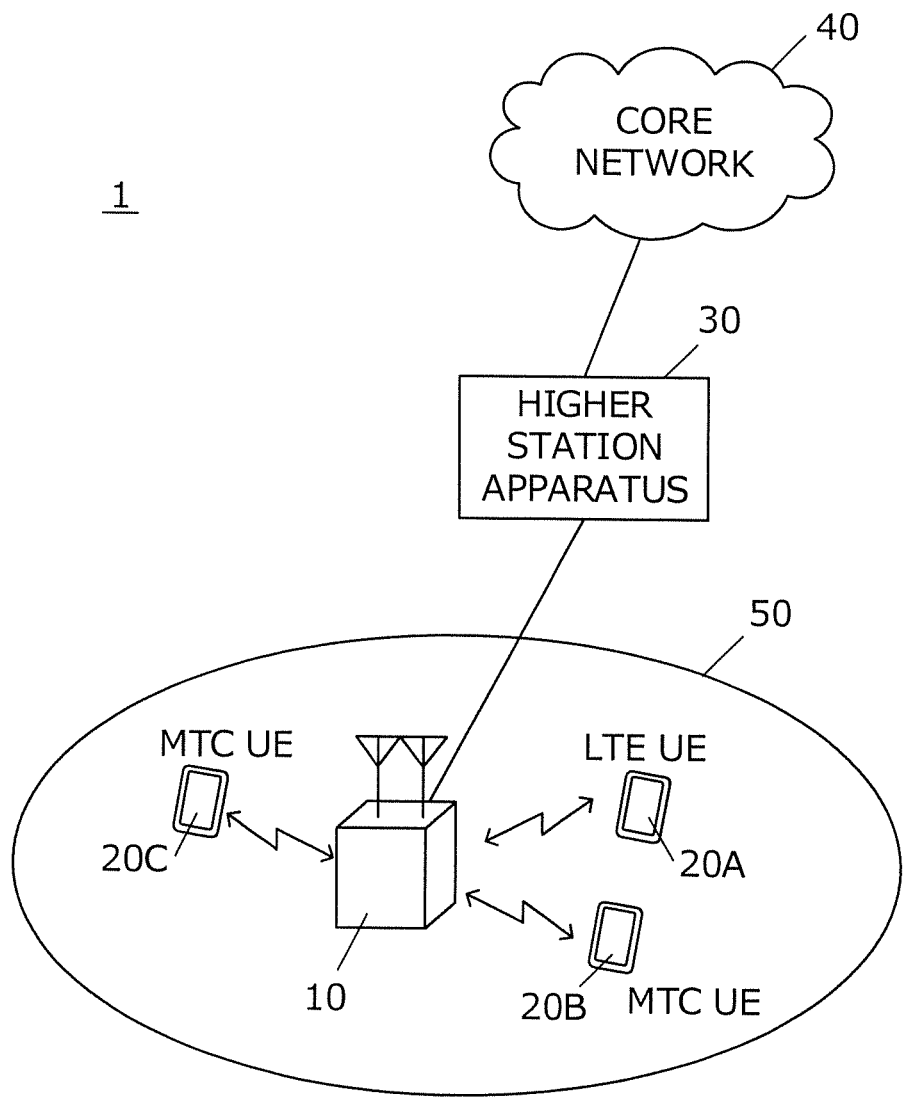
FIG. 7 is a diagram to show a schematic structure of a radio communication system according to an embodiment of the present invention.

FIG. 7 is a diagram to show an example schematic structure of the radio communication system according to the present embodiment. The radio communication system 1 shown in FIG. 7 is an example of employing an LTE system in the network domain of a machine communication system. The radio communication system 1 can adopt one or both of carrier aggregation (CA) and dual connectivity (DC) to group a plurality of fundamental frequency blocks (component carriers) into one, where the LTE system bandwidth constitutes one unit. Also, although, in this LTE system, the system bandwidth is configured to maximum 20 MHz in both the downlink and the uplink, this configuration is by no means limiting. The radio communication system 1 may be referred to as "SUPER 3G," "LTE-A" (LTE-Advanced), "IMT-Advanced," "4G," "5G," "FRA" (Future Radio Access) and so on.

As shown in FIG. 7, the radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. The higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A (hereinafter referred to as an "LTE terminal") is a terminal that supports LTE (up to Rel. 10) or LTE-A (including Rel. 10 and later versions). The user terminals 20B and 20C are MTC terminals that serve as communication devices in machine communication systems. Hereinafter the user terminals 20A, 20B and 20C will be simply referred to as "user terminals 20," unless specified otherwise.

The MTC terminals 20B and 20C are terminals that support various communication schemes including LTE and LTE-A, and are by no means limited to stationary communication terminals such electric meters, gas meters, vending machines and so on, and can be mobile communication terminals such as vehicles. The user terminals 20 may communicate with other user terminals directly, or communicate with other user terminals via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bandwidths (subcarriers) and mapping data to each subcarrier. SC-FDMA is a single-carrier communication scheme to mitigate interference between terminals by dividing the system bandwidth into bandwidths formed with one or continuous resource blocks per terminal, and allowing a plurality of terminals to use mutually different bandwidths. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a downlink control channel (PDCCH: Physical Downlink Control CHannel and/or EPDCCH: Enhanced Physical Downlink Control CHannel), a broadcast channel (PBCH: Physical Broadcast CHannel) and so on are used as downlink channels. User data, higher layer control information and predetermined SIBs (System Information Blocks) are communicated in the PDSCH. Downlink control information (DCI) is communicated using the PDCCH and/or the EPDCCH. The MIB (Master Information Block) and so on are communicated in the PBCH.

In the radio communication system 1, an uplink shared channel (PUSCH: Physical Uplink Shared CHannel), which is used by each user terminal 20 on a shared basis, an uplink control channel (PDCCH: Physical Uplink Control CHannel) and so on are used as uplink channels. User data and higher layer control information are communicated by the PUSCH.

Figure 8:
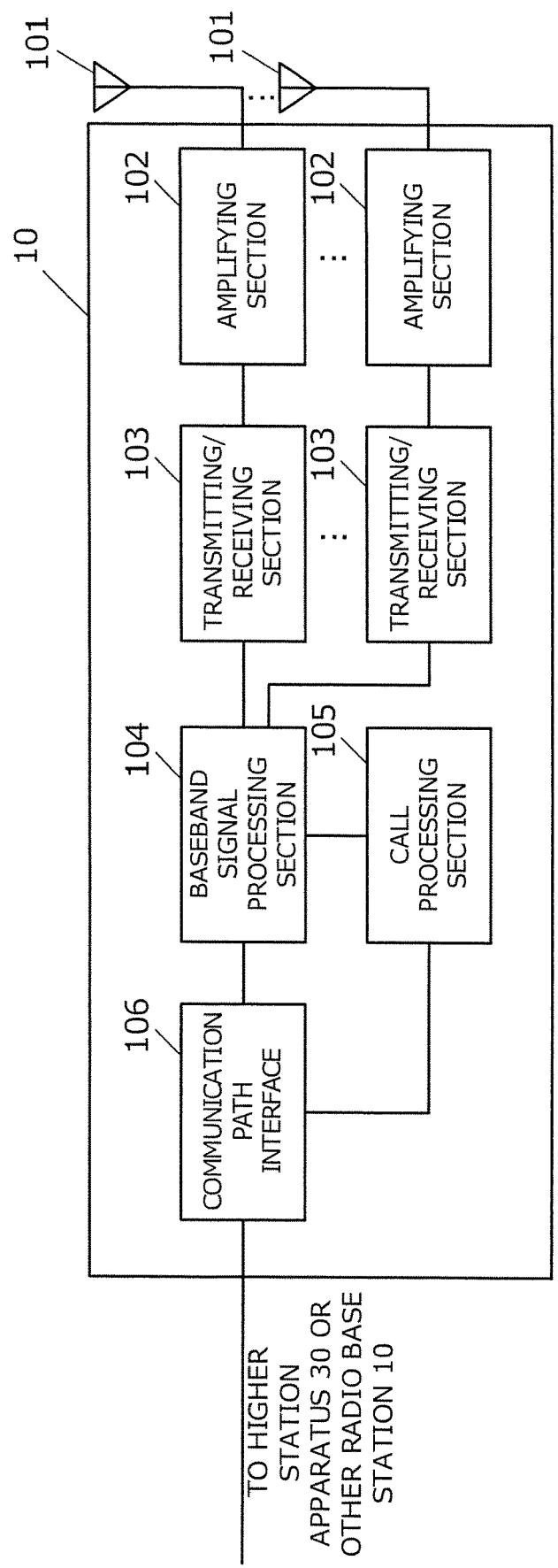
FIG. 8 is a diagram to show an example of an overall structure of a radio base station according to an embodiment of the present invention.

FIG. 8 is a diagram to show an overall structure of a radio base station 10 according to the present embodiment. As shown in FIG. 8, the radio base station 10 has a plurality of transmitting/receiving antennas 101 for MIMO (Multiple Input Multiple Output) communication, amplifying sections 102, transmitting/receiving sections (transmitting sections and receiving sections) 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts downlink signals that are pre-coded and output from the baseband signal processing section 104 on a per antenna basis, into a radio frequency bandwidth. The radio frequency signals subjected to frequency conversion in the transmitting/receiving sections 103 are amplified in the amplifying sections 102, and transmitted from the transmitting/receiving antennas 101.

The transmitting/receiving sections 103 can transmit, for example, system information (MIB, SIBs, etc.). For the transmitting/receiving sections 103, transmitters/receivers, transmitting/receiving circuits or transmitting/receiving devices that can be described based on common understanding of the technical field to which the present invention pertains can be used.

As for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface 106 transmits and receives signals to and from neighboring radio base stations (backhaul signaling) via an inter-base station interface (for example, optical fiber, the X2 interface, etc.). Alternatively, the communication path interface section 106 transmits and receives signals to and from the higher station apparatus 30 via a predetermined interface.

Figure 9:
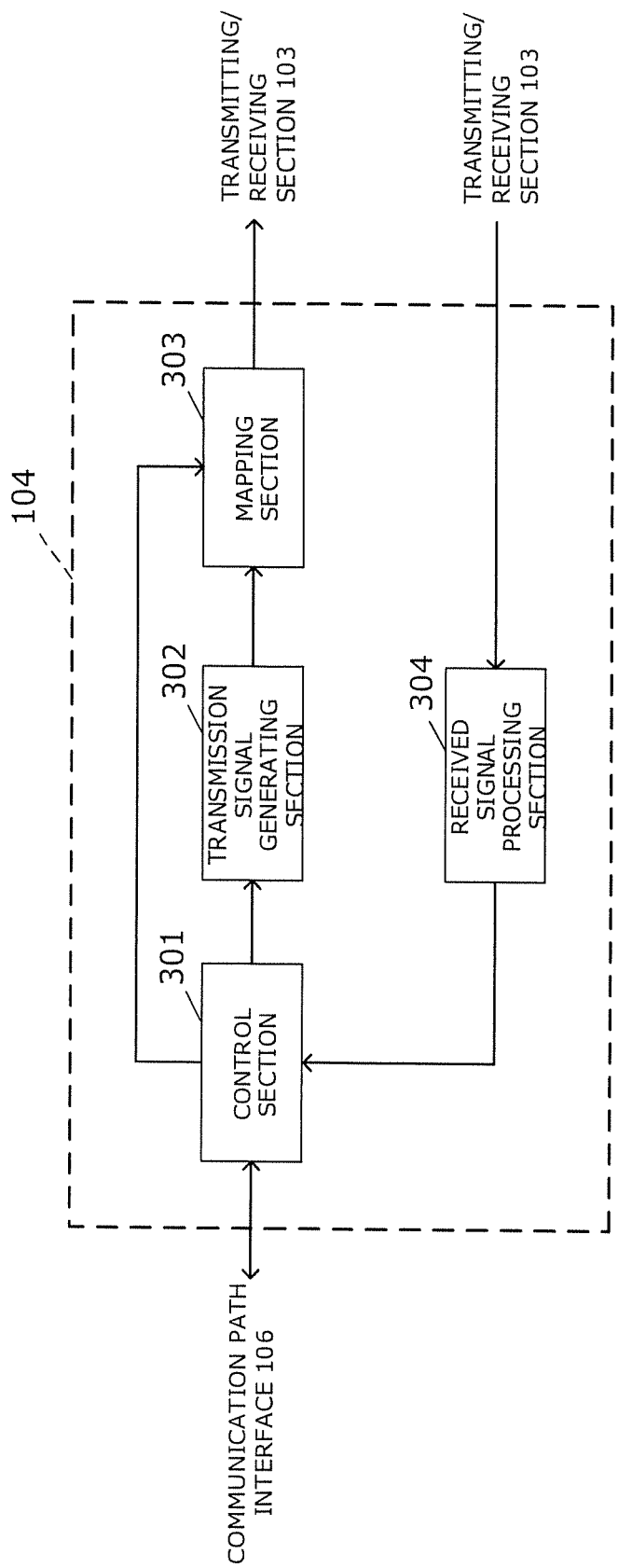
FIG. 9 is a diagram to show an example of a functional structure of a radio base station according to an embodiment of the present invention.

FIG. 9 is a diagram to show a principle functional structure of the baseband signal processing section 104 provided in the radio base station 10 according to the present embodiment. Although FIG. 9 primarily shows functional blocks that pertain to characteristic parts of the present embodiment, the radio base station 10 has other functional blocks that are necessary for radio communication as well. As shown in FIG. 9, the baseband signal processing section 104 provided in the radio base station 10 is comprised of at least of a control section 301, a transmission signal generating section 302, a mapping section 303 and a received signal processing section 304.

The control section 301 controls the scheduling of downlink user data that is transmitted in the PDSCH, downlink control information that is communicated in one or both of the PDCCH and the enhanced PDCCH (EPDCCH), downlink reference signals and so on. Also, the control section 301 controls the scheduling (allocation control) of RA preambles communicated in the PRACH, uplink data that is communicated in the PUSCH, uplink control information that is communicated in the PUCCH or the PUSCH, and uplink reference signals. Information about the allocation control of uplink signals (uplink control signals, uplink user data, etc.) is reported to the user terminals 20 by using downlink control signals (DCI).

The control section 301 controls the allocation of radio resources to downlink signals and uplink signals based on command information from the higher station apparatus 30, feedback information from each user terminal 20 and so on. That is, the control section 301 functions as a scheduler. For the control section 301, a controller, a control circuit or a control device that can be described based on common understanding of the technical field to which the present invention pertains can be used.

The transmission signal generating section 302 generates downlink signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on.

For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined narrowband radio resources (for example, maximum 6 resource blocks) based on commands from the control section 301, and outputs these to the transmitting/receiving sections 103.

For the mapping section 303, a mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminals (for example, delivery acknowledgement signals (HARQ-ACKs), data signals that are transmitted in the PUSCH, random access preambles that are transmitted in the PRACH, and so on). The processing results are output to the control section 301.

By using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

The received signal processing section 304 can be constituted by a signal processor, a signal processing circuit or a signal processing device, and a measurer, a measurement circuit or a measurement device that can be described based on common understanding of the technical field to which the present invention pertains.

Figure 10:
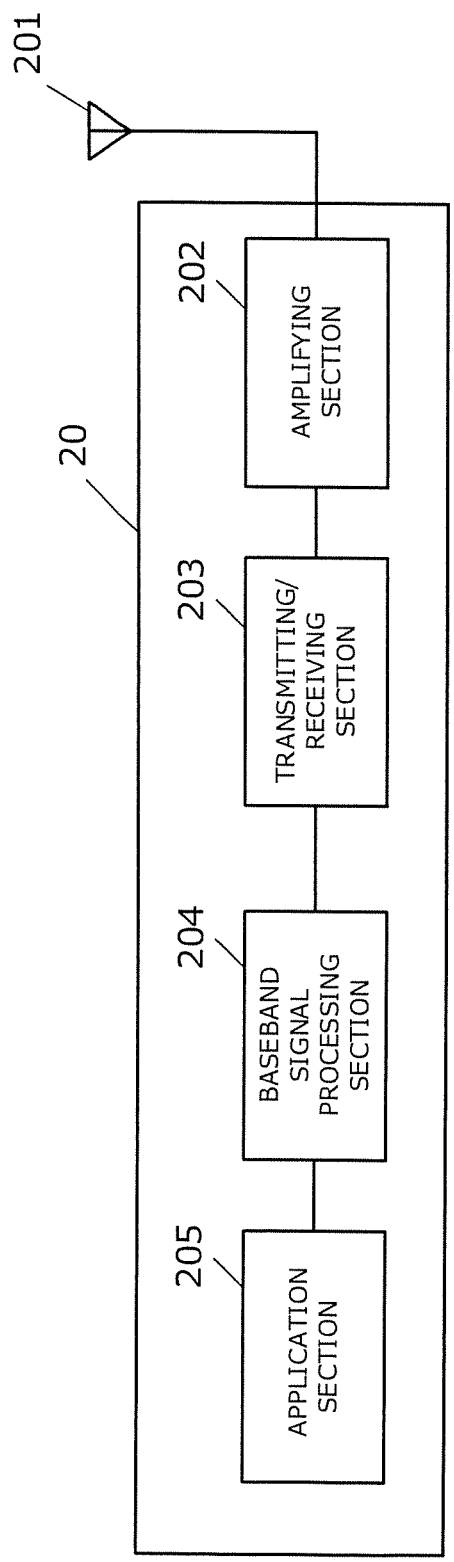
FIG. 10 is a diagram to show an example of an overall structure of a user terminal according to an embodiment of the present invention.

FIG. 10 is a diagram to show an overall structure of a user terminal 20 according to the present embodiment. Note that, although the details will not be described here, normal LTE terminals may operate and act as MTC terminals. As shown in FIG. 10, the user terminal 20 has a transmitting/receiving antenna 20, an amplifying section 202, a transmitting/receiving section (transmitting section and receiving section) 203, a baseband signal processing section 204 and an application section 205. Also, the user terminal 20 has a plurality of transmitting/receiving antennas 201, amplifying sections 202, transmitting/receiving sections 203 and so on.

A radio frequency signal that is received the transmitting/receiving antenna 201 is amplified in the amplifying section 202 and converted into the baseband signal through frequency conversion in the transmitting/receiving section 203. This baseband signal is subjected to an FFT process, error correction decoding, a retransmission control receiving process and so on in the baseband signal processing section 204. In this downlink data, downlink user data is forwarded to the application section 205. The application section 205 performs processes related to higher layers above the physical layer and the MAC layer, and so on. Also, in the downlink data, broadcast information is also forwarded to the application section 205. For the transmitting/receiving section 203, a transmitter/receiver, a transmitting/receiving circuit or a transmitting/receiving device that can be described based on common understanding of the technical field to which the present invention pertains can be used.

The transmitting/receiving section 203 can receive broadcast transport blocks and unicast transport blocks.

Uplink user data is input from the application section 205 to the baseband signal processing section 204. In the baseband signal processing section 204, a retransmission control (HARQ) transmission process, channel coding, precoding, a discrete Fourier transform (DFT) process, an inverse fast Fourier transform (IFFT) process and so on are performed, and the result is forwarded to transmitting/receiving section 203. The baseband signal that is output from the baseband signal processing section 204 is converted into a radio frequency band in the transmitting/receiving section 203. After that, the amplifying section 202 amplifies the radio frequency signal having been subjected to frequency conversion, and transmits the resulting signal from the transmitting/receiving antenna 201.

Figure 11:
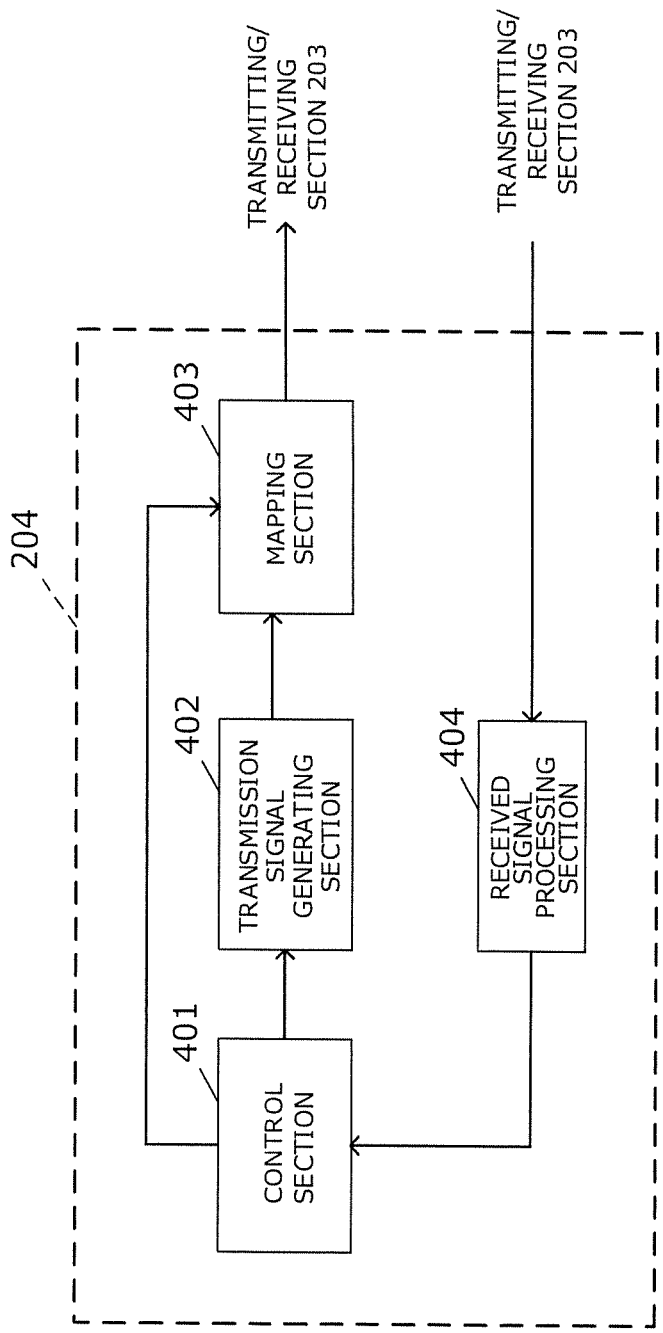
FIG. 11 is a diagram to show an example of a functional structure of a user terminal according to an embodiment of the present invention.

FIG. 11 is a diagram to show a principle functional structure of the baseband signal processing section 204 provided in the user terminal 20. Note that, although FIG. 11 primarily shows functional blocks that pertain to characteristic parts of the present embodiment, the user terminal 20 has other functional blocks that are necessary for radio communication as well. As shown in FIG. 11, the baseband signal processing section 204 provided in the user terminal 20 is comprised at least of a control section 401, a transmission signal generating section 402, a mapping section 403 and a received signal processing section 404.

For example, the control section 401 acquires the downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not retransmission control is necessary for the downlink data signals, and so on. To be more specific, the control section 401 controls the transmission signal generating section 402 and the mapping section 403.

The control section 401 switches the transport block to receive, based on priorities that are set forth in advance, according to the RRC mode of the subject terminal. For the control section 401, a controller, a control circuit or a control device that can be described based on common understanding of the technical field to which the present invention pertains can be used.

The transmission signal generating section 402 generates UL signals based on commands from the control section 401, and outputs these signals to the mapping section 403. For example, the transmission signal generating section 402 generates uplink control signals such as delivery acknowledgement signals (HARQ-ACKs) and channel state information (CSI) based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

For the uplink control signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and outputs these to the transmitting/receiving section 203. For the mapping section 403, mapper, a mapping circuit or a mapping device that can be described based on common understanding of the technical field to which the present invention pertains can be used.

The received signal processing section 404 performs the receiving processes (for example, demapping, demodulation, decoding and so on) of DL signals (for example, downlink control signals transmitted from the radio base station, downlink data signals transmitted in the PDSCH, and so on). The received signal processing section 404 outputs the information received from the radio base station 10, to the control section 401. The received signal processing section 404 outputs, for example, broadcast information, system information, paging information, RRC signaling, DCI and so on, to the control section 401.

Also, the received signal processing section 404 may measure the received power (RSRP), the received quality (RSRQ) and channel states, by using the received signals. The measurement results may be output to the control section 401.

The received signal processing section 404 can be constituted by a signal processor, a signal processing circuit or a signal processing device, and a measurer, a measurement circuit or a measurement device that can be described based on common understanding of the technical field to which the present invention pertains. The received signal processing section 404 can constitute the receiving section according to the present invention.

Note that the block diagrams that have been used to describe the above embodiment show blocks in function units. These functional blocks (components) may be implemented in arbitrary combinations of hardware and software. The means for implementing each functional block is not particularly limited. That is, each functional block may be implemented with one physically-integrated device, or may be implemented by connecting two or more physically-separate devices via radio or wire and using these multiple devices.

For example, part or all of the functions of radio base stations 10 and user terminals 20 may be implemented using hardware such as an ASIC (Application-Specific Integrated Circuit), a PLD (Programmable Logic Devices), an FPGA (Field Programmable Gate Array), and so on. The radio base stations 10 and user terminals 20 may be implemented with a computer device that includes a processor (CPU), a communication interface for connecting with networks, a memory and a computer-readable storage medium that stores programs.

The processor and the memory are connected with a bus for communicating information. The computer-readable recording medium is a storage medium such as, for example, a flexible disk, an opt-magnetic disk, a ROM, an EPROM, a CD-ROM, a RAM, a hard disk and so on. Also, the programs may be transmitted from the network through, for example, electric communication channels. The radio base stations 10 and user terminals 20 may include input devices such as input keys and output devices such as displays.

The functional structures of the radio base stations 10 and user terminals 20 may be implemented by using the above-described hardware, may be implemented by using software modules to be executed on the processor, or may be implemented by combining both of these. The processor controls the whole of the user terminals by running an operating system. The processor reads programs, software modules and data from the storage medium into the memory, and executes various types of processes. These programs have only to be programs that make a computer execute each operation that has been described with the above embodiments. For example, the control section 401 of the user terminals 20 may be stored in a memory and implemented by a control program that operates on the processor, and other functional blocks may be implemented likewise.

Note that the present invention is by no means limited to the above embodiments and can be carried out with various changes. The sizes and shapes illustrated in the accompanying drawings in relationship to the above embodiment are by no means limiting, and may be changed as appropriate within the scope of optimizing the effects of the present invention. Besides, implementations with various appropriate changes may be possible without departing from the scope of the object of the present invention.

The disclosure of Japanese Patent Application No. 2015-016058, filed on Jan. 29, 2015, including the specification, drawings and abstract, is incorporated herein by reference in its entirety.

The invention claimed is:

1. A user terminal operating in a narrowband which is a part of a system bandwidth, the user terminal comprising:
 a receiver that receives downlink control information by monitoring a search space, located in a narrow band, of a downlink control channel; and
 a processor that controls decoding of a downlink shared channel based on the downlink control information,
 wherein, when the downlink control channel is transmitted in a same subframe as the downlink shared channel, the processor controls reception of the downlink shared channel and/or the downlink control channel based on locations of a frequency resource to which the search space is mapped and a frequency resource to which the downlink shared channel is mapped.

2. The user terminal according to claim 1, wherein the search space is a user terminal-specific search space and/or a common search space.

3. The user terminal according to claim 1, wherein the narrowband consists of six resource blocks.

4. A radio communication method for a user terminal operating in a narrowband which is a part of a system bandwidth, the radio communication method comprising:
 receiving downlink control information by monitoring a search space, located in a narrow band, of a downlink control channel;
 controlling decoding of a downlink shared channel based on the downlink control information; and
 when the downlink control channel is transmitted in a same subframe as the downlink shared channel, controlling reception of the downlink shared channel and/or the downlink control channel based on locations of a frequency resource to which the search space is mapped and a frequency resource to which the downlink shared channel is mapped.

5. The user terminal according to claim 2, wherein the narrowband consists of six resource blocks.

* * * * *